United States Patent Office 3,533,581
Patented Oct. 13, 1970

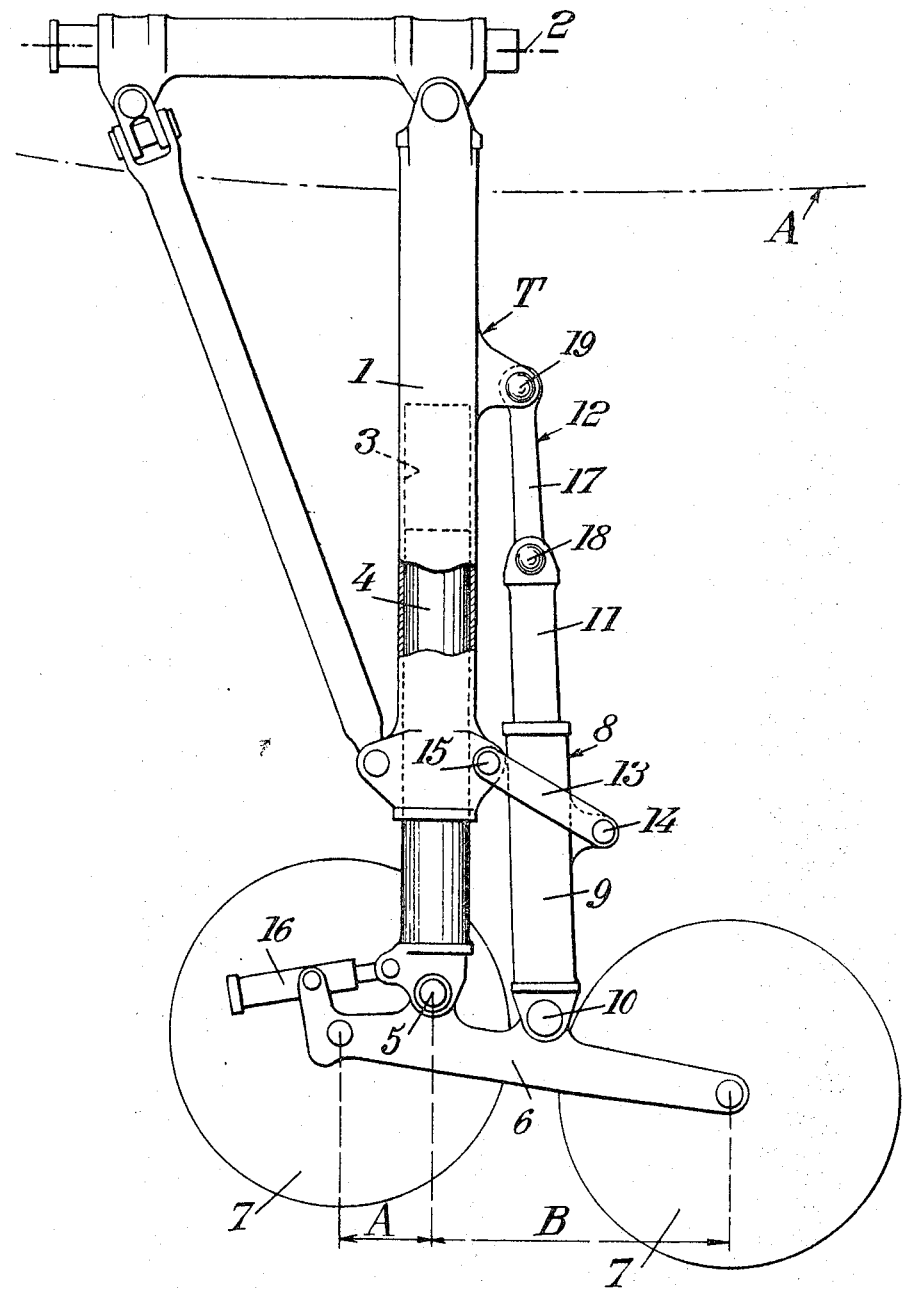

3,533,581
AIRCRAFT UNDERCARRIAGE
Jacques Leclercq, St.-Leu-la-Foret, France, assignor, by mesne assignments, to Societe National d'Etude et de Construction de Moteurs d'Aviation, Paris, France, a corporation of France
Filed Oct. 21, 1968, Ser. No. 769,134
Claims priority, application France, Oct. 20, 1967, 125,329
Int. Cl. B64c 25/58
U.S. Cl. 244—104                           9 Claims

ABSTRACT OF THE DISCLOSURE

The undercarriage comprises a leg connected, at one end, to the framework of the air craft, and having, at its other end, a bore in which can slide a piece at whose free end is articulated about a pivot spindle, a rocker carrying two groups of wheels. The rocker is connected to the leg by a telescopic shock absorber whose body is articulated on the rocker about an articulation spindle parallel to the pivot spindle, and whose shaft is coupled to the leg by a rotary-jointed coupling. The shock absorber body is connected to the leg by a rod whose two articulation spindles are parallel to the pivot spindle.

---

This invention relates to aircraft undercarriages, of the type which comprises at least one leg of which one of the two ends is connected to the framework of the aircraft, the other end of this leg being provided with a bore in which can slide a slidable piece at the free end of which is articulated, about a pivot spindle, a rocker carrying at least one wheel—or at least one group of coaxial wheels. The invention is more particularly, but not exclusively, concerned with undercarriages of this type in which the rocker carries two groups of coaxial wheels, these two groups, being disposed in tandem.

An object of this invention is to provide undercarriages that are practical, in particular with regard to their simplicity, their robustness, their weight and their facility of maintenance.

An undercarriage according to this invention is characterized by the fact that,

The rocker is connected to the leg by a shock absorber having two telescopic elements of which one of the two elements, preferably the body of the shock absorber, is articulated on the rocker about an articulation spindle parallel to the pivot spindle of the rocker and situated behind this pivot spindle, the other element of this shock absorber being coupled to the leg by the intermediary of a rotary-jointed coupling, this articulation spindle being capable of transmitting the torsion forces to which the undercarriage can be subjected, which torsion forces are principally constituted by the torsion forces about the slidable piece and by a part of the torsion forces about the longitudinal axis of the rocker, and The element of the shock absorber articulated on the rocker is connected to the leg by a rod of which the two ends are articulated respectively on the element in question and on this leg, the spindles of the two articulations of this rod being parallel to the pivot spindle of the rocker, Due to which the torsion forces mentioned above are transmitted to the leg by the intermediary of the ensemble constituted by the articulation spindle and the bearing with which it co-operates, the element of the shock absorber articulated on the rocker and the rod, which ensemble presents qualities of simplicity, robustness, lightness and facility of maintenance.

Apart from this principal feature, the invention includes certain other features which will become apparent from the following complementary specific description, and from the accompanying drawing, which specific description and drawing are given merely by way of example.

The single figure of this drawing represents a view in elevation of an undercarriage established according to the invention.

In the particular case which will now be considered, by way of example, an aircraft A is to be equipped with a principal landing gear formed of two undercarriages T positioned symmetrically on the aircraft A, each undercarriage T comprising a rocker carrying two groups of coaxial wheels disposed (the groups) in tandem, such undercarriages T being supposed, again for example, to be retractable.

As shown in the accompanying single figure, this undercarriage T comprises a leg 1 of which one of the ends is articulated on the framework of the aircraft A by the intermediary of a retraction spindle 2, the other end of this leg 1 being provided with a bore 3 in which can slide a slidable piece 4 at the free end of which is articulated, about a pivot spindle 5, a rocker 6 carrying two groups of coaxial wheels 7, these two groups being disposed in tandem.

Each group of wheels 7 can be constituted by two wheels mounted in diabolo on opposite sides of the rocker 6.

This being the case, according to the principal feature of the invention,

The rocker 6 is connected to the leg 1 by a shock absorber 8 having two telescopic elements, of which one of the two elements, preferably and as will be supposed hereafter, the body 9 of the shock absorber 8, is articulated on the rocker 6 about an articulation spindle 10 parallel to the pivot spindle 5 of the rocker 6 and situated behind this pivot spindle 5, the other element, that is to say the shaft 11 of the shock absorber 8, being coupled to the leg 1 by the intermediary of a rotary-jointed coupling 12, this articulation spindle 10 being capable—in particular with regard to its dimensions and the dimensions of the bearing with which it co-operates—of transmitting the torsion forces to which the undercarriage can be subjected, which torsion forces are principally constituted by the torsion forces about the slidable piece 4 and by a part of the torsion forces about the longitudinal axis of the rocker 6, and The body 9 of the shock absorber 8 articulated on the rocker 6 is connected to the leg 1 by a rod 13 of which the two ends are articulated respectively on the body 9 in question and on the leg 1, the spindles 14 and 15 of the two articulations of this rod 13 being parallel to the pivot spindle 5 of the rocker 6.

It will then be appreciated that the torsion forces mentioned above are transmitted to the leg 1 by the intermediary of the ensemble constituted by the articulation spindle 10 and its bearing, the body 9 of the shock absorber 8 and the rod 13, which ensemble presents qualities of simplicity, robustness, lightness and facility of maintenance.

For this purpose, the embodiment illustrated in the figure can be used, according to which the front group of wheels is disposed in front of the pivot spindle 5 of the rocker 6, at a distance A from this spindle, and the rear group of wheels is disposed behind the pivot spindle 5 of the rocker 6, at a distance B from this spindle greater than the distance A, and the ratio between the distance B and the distance A can be advantageously comprised between two and five.

Preferably, the spindle of articulation of the body 9 of the shock absorber 8 on the rocker 6 is situated in the neighborhood of the middle of this rocker 6 so as to balance the forces coming from the front group of wheels and from the rear group of wheels.

It is then advantageous to dispose a pitch shock absorber 16, of the telescopic type, interposed between the front part of the rocker 6 and the lower part of the slidable piece 4.

As for the rotary-jointed coupling 12, it is advantageously constituted by a tie-rod 17 pivotably mounted respectively on the shaft 11 of the shock absorber 8 and on the leg 1, by the intermediary of two rotary joints 18 and 19.

The present invention provides an undercarriage which presents a certain number of advantages, among which can be cited those summarized by the following points:

The shock absorber connecting the rocker to the leg is independent of the structure of the undercarriage, and, accordingly, it is easily accessible and dismantlable.

The shock absorber connecting the rocker to the leg transmits to the leg the vertical forces generated on the rocker by the intermediary of the rotary-jointed coupling, this shock absorber being constantly maintained by the rod.

The body of the shock absorber articulated on the rocker constitutes the lower branch of a compass whose upper branch is constituted by the rod, the ensemble constituted by the articulation spindle and its bearing, the body of the shock absorber and the rod transmitting to the leg the torsion forces to which the ensemble of the undercarriage can be subjected, which torsion forces are principally constituted by, on the one hand, the torsion forces about the slidable piece, and on the other hand, a part of the torsion forces about the longitudinal axis of the rocker (the other part of these latter torsion forces being transmitted to the leg by the pivot spindle of the rocker).

The said compass transmits the torsion forces directly, that is, without the torsion forces being transmitted by a pair of elements one of which slides within the other, The slidable piece transmits practically no vertical forces, and it can be constituted by a simple guiding tube which does not co-operate with any shock absorbing system, this guiding tube having simply to take the longitudinal and transverse forces.

Although the invention has been described specifically with reference to a particular embodiment, the invention should not be so limited, since many modifications and changes are possible without departing from the spirit or scope of the invention.

What I claim is:

1. An aircraft undercarriage comprising in combination:
   at least one leg having two ends one of which two ends is adapted to be connected to the aircraft and the other of which two ends is provided with a bore,
   a slidable piece slidably mounted in said bore and having a free end,
   a rocker articulated, about a pivot spindle, on said free end, and adapted to carry at least one wheel,
   wherein said rocker is connected to said leg by a shock absorber having two telescopic elements, one of which two elements is articulated on the rocker about an articulation spindle parallel to said pivot spindle of said rocker and situated behind said pivot spindle, and the other of which two elements is coupled to said leg by the intermediary of a rotary-jointed coupling,
   said articulation spindle being capable of transmitting the torsion forces to which the undercarriage can be subjected, which torsion forces are principally constituted by the torsion forces about said slidable piece and by a part of the torsion forces about the longitudinal axis of said rocker,
   and wherein said one element of said shock absorber articulated on said rocker is connected to said leg by a rod having two ends, one of which is articulated, about an articulation spindle, on said one element and the other of which is articulated, about another articulation spindle, on said leg, said two articulation spindles of this rod being parallel to said pivot spindle of said rocker.

2. An undercarriage according to claim 1, wherein said shock absorber comprises a body and a shaft, said body constituting said one element and said shaft constituting said other element.

3. An undercarriage according to claim 2, wherein said rocker carries two groups of coaxial wheels, these two groups being disposed in tandem.

4. An undercarriage according to claim 3, wherein each said group of wheels is constituted by two wheels mounted in diabolo on opposite sides of said rocker.

5. An undercarriage according to claim 3, wherein the front group of wheels is disposed in front of said pivot spindle of said rocker, at a distance A from this pivot spindle, and the rear group of wheels is disposed behind said pivot spindle of said rocker, at a distance B from this pivot spindle greater than the distance A.

6. An undercarriage according to claim 5, wherein the ratio between the distance B and the distance A is comprised between two and five.

7. An undercarriage according to claim 3, wherein said spindle of articulation of said body of said shock absorber on said rocker is disposed in the neighbourhood of the middle of said rocker.

8. An undercarriage according to claim 3, wherein a pitch shock absorber, of telescopic type, is disposed between the front part of said rocker and the lower part of said slidable piece.

9. An undercarriage according to claim 3, wherein said rotary-jointed coupling is constituted by a tie-rod pivotably mounted respectively on said shaft of said shock absorber and on said leg, by the intermediary of two rotary joints.

References Cited
UNITED STATES PATENTS

| | | | |
|---|---|---|---|
| 2,357,489 | 9/1944 | Palley et al. | 244—102 |
| 2,392,905 | 1/1946 | Dowty | 244—102 |

MILTON BUCHLER, Primary Examiner

P. E. SAUBERER, Assistant Examiner